(12) United States Patent
Brown et al.

(10) Patent No.: US 9,222,508 B2
(45) Date of Patent: Dec. 29, 2015

(54) BEARING RACE WITH INTEGRATED SPRING

(75) Inventors: James Kevin Brown, Rock Hill, SC (US); Charles Schwab, Fort Mill, SC (US); Jordan Miles, Charlotte, NC (US); Michael Turner, Fort Mill, SC (US); Brian Lee, York, SC (US); Guihui Zhong, Charlotte, NC (US); Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 447 days.

(21) Appl. No.: 13/464,171

(22) Filed: May 4, 2012

(65) Prior Publication Data

US 2012/0294562 A1 Nov. 22, 2012

Related U.S. Application Data

(60) Provisional application No. 61/487,028, filed on May 17, 2011.

(51) Int. Cl.
| F16C 23/10 | (2006.01) |
| F16C 19/52 | (2006.01) |
| F16C 19/36 | (2006.01) |
| F16C 25/08 | (2006.01) |

(52) U.S. Cl.
CPC ............. *F16C 19/525* (2013.01); *F16C 19/364* (2013.01); *F16C 25/083* (2013.01)

(58) Field of Classification Search
CPC ...... F16C 19/364; F16C 19/52; F16C 19/525; F16C 19/527; F16C 25/083; F16C 33/586

USPC ......... 384/493, 557, 563, 564, 569, 571, 581, 384/582, 584, 585, 905
See application file for complete search history.

(56) References Cited

U.S. PATENT DOCUMENTS

| 3,772,934 | A | | 11/1973 | Warren |
| 4,336,971 | A | * | 6/1982 | Reiter ........................... 384/484 |
| 5,028,152 | A | | 7/1991 | Hill |
| 5,470,157 | A | * | 11/1995 | Dougherty et al. ........... 384/448 |
| 5,887,984 | A | * | 3/1999 | Duval ............................ 384/477 |
| 2011/0075959 | A1 | * | 3/2011 | Koizumi ....................... 384/571 |

FOREIGN PATENT DOCUMENTS

DE 004221802 * 1/1994

* cited by examiner

*Primary Examiner* — James Pilkington
(74) *Attorney, Agent, or Firm* — Simpson & Simpson, PLLC

(57) ABSTRACT

A bearing race encapsulation apparatus, which has a spring assembly integrated into a hearing that allows the hearing to compensate for varying expansions and contractions caused by differences in temperature. The bearing race encapsulation apparatus includes an outer bearing ring with an end face and an outer face with a indent formed in the outer face. An encapsulation ring, which has a retention element that is snapped into the indent of the outer bearing ring, a first segment that extends axially outwardly from the retention element, and a second segment that extends radially inwardly from the first segment. A spring is arranged axially between the second segment of the encapsulation ring and the outer bearing ring to compensate for the expansion and contraction.

6 Claims, 5 Drawing Sheets

BEARING RACE WITH INTEGRATED SPRING

CROSS REFERENCE OF RELATED APPLICATION

This application claims the priority of U.S. 61/487,028 filed May 17, 2011, which is incorporated by reference herein.

FIELD OF INVENTION

The present invention relates generally to bearings and more particularly to a spring assembly integrated into a bearing assembly to compensate for varying expansions and contractions caused by differences in temperature.

BACKGROUND OF THE INVENTION

Adjusted bearing arrangements, which typically include bearings such as angular contact ball bearings, tapered roller bearings, or tandem ball bearings, can be, for example, used in automotive transmissions which require a device to manage axial preload across operating temperature ranges of the transmission when dissimilar materials are used to support the bearing. Typically, this occurs when a steel bearing is installed in a non-steel housing which has a different thermal expansion coefficient than the steel bearing.

Bearings and/or encapsulated spring assemblies that are intended to account for thermal expansion and contraction of components which have dissimilar materials and are used in conjunction with each other are known. However, many known devices can require significant axial preload and have a limited range of expansion and contraction. Moreover, specialized assembly process may be required. Further, multiple encapsulation rings are required and, in some instances, the encapsulated spring is unattached to the bearing and must be assembled separately.

U.S. Pat. No. 5,028,152, for example, discloses the vulcanization of an elastomer onto a cavity within a machined outer ring of a bearing, bonding an elastomer to a metallic backing, or encapsulating an elastomer within two cups which are snapped into a cavity in an outer ring or an inner ring. However, there are various drawbacks to such arrangements. For example, a special process is required to vulcanize the elastomer onto the bearing race and such arrangements can affect the load carrying capability of the bearing. The bonding of an elastomer to a metallic backing is an especially costly process. Moreover, encapsulated design with two cups requires a special profiled elastomer which is difficult to assemble and the elastomer increases the tolerance stack-up. Additionally, the encapsulated design requires shimming on an individual basis when trying to achieve a desired preload at the application assembly. Further, many elastomeric materials are compressible and cannot withstand variation in temperature cycles.

Also, thermal compensation elements are known that are not attached to a bearing. However, these elements require separate assembly and two encapsulation rings.

In addition, thermal compensation elements are known that are attached to a bearing. However, these elements require two encapsulation rings.

Moreover, encapsulated wave springs which are not attached to a bearing are known. However, similar to the thermal compensation elements that are not attached to a bearing, these units require separate assembly and two encapsulation rings.

Further, see U.S. Pat. No. 3,772,934, for example, which discloses solutions to compensate and/or correct for tooth misalignment of helical gears that rotate about a shaft. In the '934 patent a dish shaped flat spring, also known as a disc spring or belleville washer, compensates for axial movement of one of the helical gears. The flat spring is housed in a cup washer, and the cup washer and flat spring are freely mounted on the shaft on which the one helical gear rotates, such that the washer and spring move axially independent of each other and independent from the one helical gear.

SUMMARY OF THE INVENTION

The present invention is directed to a bearing race encapsulation apparatus, utilizing a spring assembly, which can account for high loads and extreme variations of temperature that may occur to a system when, for example, a shaft and an associated housing for a transmission, gearbox, axle or the like are comprised of different materials and have different coefficients of thermal expansion (e.g., steel shaft and an aluminum housing). Typically, the bearing races referred to in the present invention are used in machined-race bearing assemblies, including tapered roller bearings, angular contact bearings, and tandem ball bearings. The bearing assemblies are preloaded axially to achieve a desired stiffness of an entire bearing/shaft system, as well as lead to optimum bearing life. However, due to the differences of materials and different coefficients of thermal expansion, the rates of expansion and contraction can vary causing a wide variation in bearing preload over a range of temperatures. This variation can lead to an excessive preload, a loss of preload, an increased frictional torque, and/or excessive clearance in bearing support, which in turn can affect the stiffness of the bearing arrangement and possibly lead to a reduction in the life of the bearing and noise.

The present invention, which is inexpensive and relatively easy to manufacture and assemble, compensates for the potential loading and thermal changes without affecting the bearing's load carrying capacity by maintaining a desired preload force on the bearing by integrating a spring assembly into the bearing.

Broadly, the present invention can be defined as a bearing race encapsulation apparatus, which comprises an outer bearing ring that can have an end face and an outer face with an indent formed in the outer face, an encapsulation ring that can have a retention element, which is snapped into the indent of the outer bearing ring, a first segment with a first end and a second end and a second segment with a first end and a second end where the first segment can extend axially outwardly at the retention element from the first end of the first segment to the second end of the first segment and the second segment can extend radially inwardly at a substantially 90° angle from the first end of the second segment, which is connected to the second end of the first segment, toward the second end of the second segment, and a spring which can be biased and arranged axially between the second segment of the encapsulation ring and the outer bearing ring.

The retention element can be a grip tab, which is substantially U-shaped and has an extension at one end that axially opposes the first segment. Two or more grip tabs are typically required. Alternatively, the retention element can be a substantially U-shaped flange that extends continuously in the indent around the circumference of the outer ring.

The indent in the outer bearing ring can have a width which allows for axial movement of the encapsulation ring.

The encapsulation ring can bottom out in the indent and/or on the end face of the outer ring.

The first segment of the encapsulation ring can extend axially beyond the end face of the outer bearing ring and spring can be arranged axially between the second segment of the encapsulation ring and the end face of the outer bearing ring.

The encapsulation ring can have a third segment which extends axially inwardly from the second end of the second segment.

The outer bearing ring can have an inwardly recessed step, on which the spring can be arranged, formed in a radially outermost section of the end face.

The retention element can be a barbed grip tab. Typically, two or more barbed grip tabs are required. Alternatively, the barbed grip tab can extend in the indent around the circumference of the outer ring forming an endless flange.

Alternatively, the present invention can be defined as a bearing race encapsulation apparatus, which comprises an outer bearing ring having an end face and an outer face with an indent formed in the outer face, an L-shaped encapsulation ring having a retention element, which is snapped into the indent of the outer bearing ring, a first leg of the encapsulation ring being substantially parallel to the outer face of the outer bearing ring and a second leg of the encapsulation ring being substantially parallel to the end face of the outer bearing ring, and a spring biased and arranged axially between the second leg of the encapsulation ring and the outer bearing ring. The first leg is substantially perpendicular to the second leg, of the L-shaped encapsulating ring. The term "substantial" means within about 5° or less.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
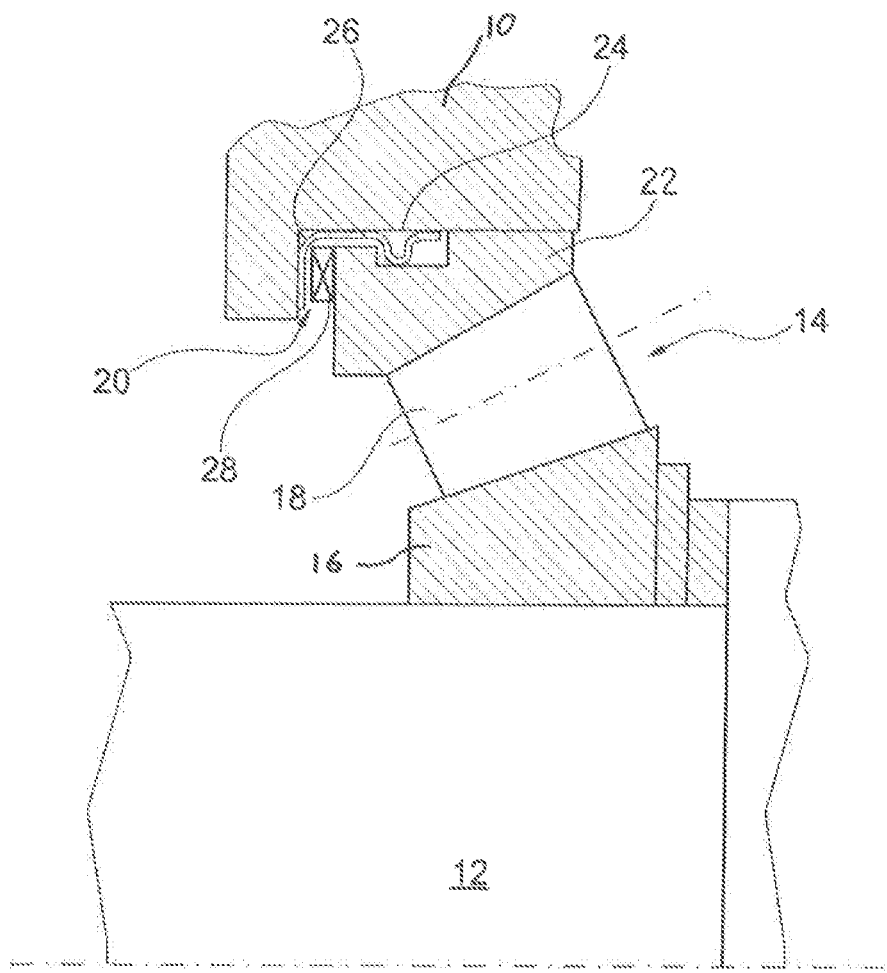
FIG. 1 illustrates a cross sectional view of a bearing of the present invention mounted between a housing and a shaft.

FIG. 1 illustrates a typical environment in which a bearing race encapsulation apparatus of the present invention is used. Between housing 10 and shaft 12 is bearing 14. Typically, shaft 12 is made of steel and housing 10 is made of aluminum. Aluminum and steel have different coefficients of thermal expansion. Bearing 14 is made up of inner bearing ring 16 roller bodies 18 and bearing race encapsulating apparatus 20. Bearing race encapsulating apparatus 20 includes an outer bearing ring 22 with indent 24, encapsulating ring 26 and spring 28. FIGS. 2-5 a more detailed description of the various embodiments of bearing race encapsulating apparatus 20.

Figure 2:
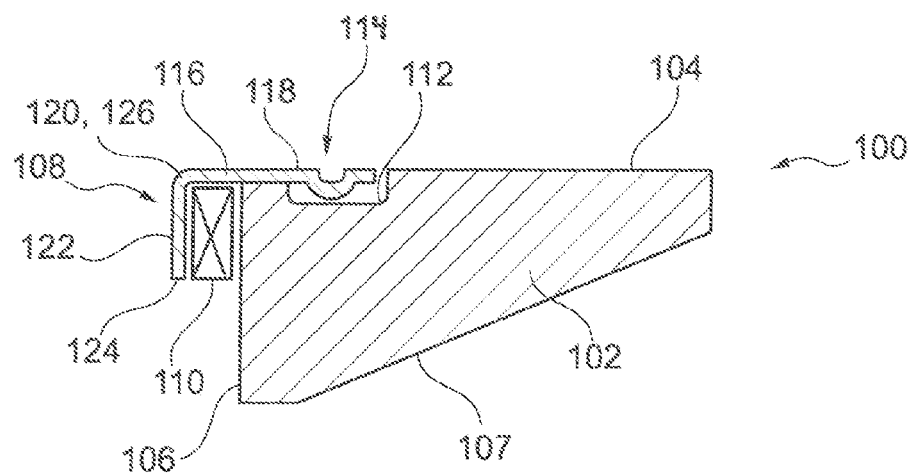
FIG. 2 is a cross-sectional view of a first embodiment of a first bearing race encapsulation apparatus of the present invention.

FIG. 2 illustrates a first bearing race encapsulation apparatus 100. The bearing race encapsulation apparatus 100 includes an outer bearing ring 102, which has an outer face 104 and an end face 106, raceway 107 for roller bodies, an encapsulation ring 108, and a spring 110. The outer bearing ring 102 has an indent 112 formed in the outer face 104. The encapsulation ring 108 has retention element(s) 114, such as two or more grip tabs or a continuously circumferential flange, which is/are snapped into the indent 112 of the outer bearing ring 102. The encapsulation ring 108 further includes a first segment 116 which has a first end 118 and a second end 120 and a second segment 122, which has a first end 124 and a second end 126. The first segment 116 extends axially outward from the retention element(s) 114, beyond the outer bearing ring 102, and the second segment 122 extends radially inward from the second end 120 of the first segment 116. The spring 110, which compensates for varying expansions and contractions caused by temperature changes, is arranged axially between the second segment 122 of the encapsulation ring 108 and the end face 106 of the outer bearing ring 102. To prevent the spring 110 from being entirely flattened under load, the retention element(s) 114 of encapsulation ring 108 can bottom out in the indent 112 of the outer bearing ring 102 first.

Figure 3:
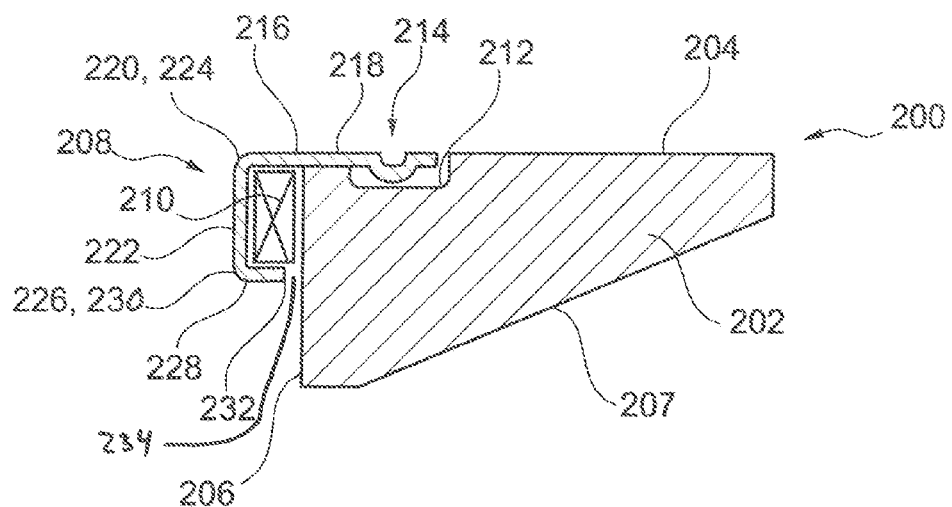
FIG. 3 is a cross-sectional view of a second bearing race encapsulation apparatus of the present invention.

FIG. 3 illustrates a second embodiment of a hearing race encapsulation apparatus 200. The bearing race encapsulation apparatus 200 includes an outer bearing ring 202, which has an outer tee 204 and an end face 206, raceway 207 for roller bodies, an encapsulation ring 208, and a spring 210. The outer bearing ring 202 has an indent 212 formed in the outer face 204. The encapsulation ring 208 has retention element(s) 214, such as two or more grip tabs or a continuously circumferential flange, which is/are snapped into the indent 212 of the outer bearing ring 202. The encapsulation ring 208 further includes a first segment 216, which has a first end 218 and a second end 220, a second segment 222, which has a first end 224 and a second end 226, and a third segment 228, which has a first end 230 and a second end 232. The first segment 216 extends axially outward from the retention element(s) 214, beyond the outer bearing ring 202, the second segment 222 extends radially inward from the second end 220 of the first segment 216, and the third segment 228 extends axially inward from the second end 226 of the second segment 222. The spring 210 is positioned axially between the encapsulation ring 208 and adjacent to the end face 206 of the outer bearing ring 202 with the spring 210, which compensates for varying expansions and contractions caused by temperature changes, is arranged within a recess 234 formed by the first segment 216, the second segment 222, and the third segment 228. To prevent the spring 210 from being entirely flattened under load, the encapsulation ring 208, utilizing the third segment 228, can bottom out on the end face 206 of the outer bearing ring 202 first.

Figure 4:
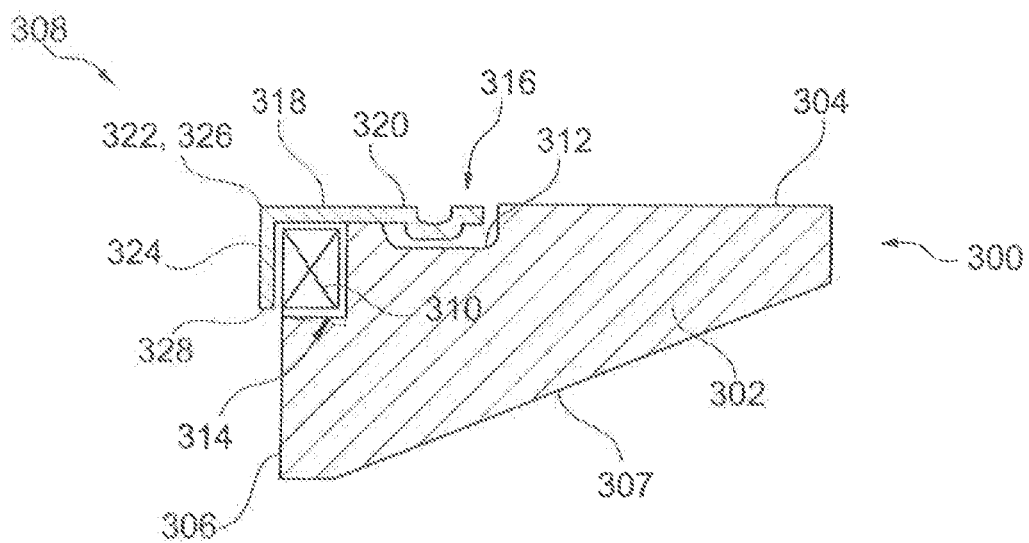
FIG. 4 is a cross-sectional view of a third hearing race encapsulation apparatus of the present invention.

FIG. 4 illustrates a third embodiment of a bearing race encapsulation apparatus 300. The bearing race encapsulation apparatus 300 includes an outer bearing ring 302, which has an outer face 304 and an end face 306, raceway 307 for roller bodies, an encapsulation ring 308, and a spring 310. The outer bearing ring 302 has an indent 312 formed in the outer face 304 and an inwardly recessed step 314 formed in a radially outermost section of the end face 306. The encapsulation ring 308 has retention element(s) 316, such as two or more grip tabs or a continuously circumferential flange, which is/are snapped into the indent 312 of the outer bearing ring 302. The encapsulation ring 308 further includes: a first segment 318 which has a first end 320 and a second end 322 and a second segment 324 which has a first end 326 and a second end 328. The first segment 318 extends axially outward, beyond the outer bearing ring 302, from the retention element(s) 316 and the second segment 324 extends radially inward from the second end 322 of the first segment 316. The spring 310, which compensates for varying expansions and contractions caused by temperature changes, is arranged on a step 314 of the outer bearing ring 302, axially between the second segment 324 of the encapsulation ring 308 and the outer bearing ring 302. To prevent the spring 310 from being entirely flattened under load, the retention element(s) of encapsulation ring 308 can bottom out in the indent 312 of the outer bearing ring 302 first.

Figure 5:
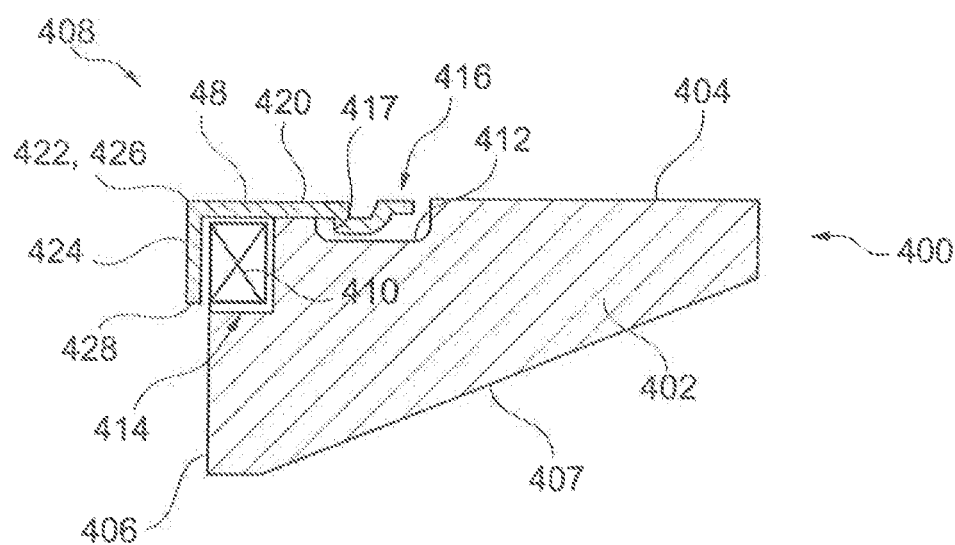
FIG. 5 is a cross-sectional view of a fourth bearing race encapsulation apparatus of the present invention.

FIG. 5 illustrates a fourth embodiment of a bearing race encapsulation apparatus 400. The hearing race encapsulation apparatus 400 includes an outer bearing ring 402, which has an outer face 404 and an end face 406 raceway 407 for roller bodies, an encapsulation ring 408, and a spring 410. The outer bearing ring 402 has an indent 412 formed in the outer face 404 and an inwardly recessed step 414 formed in a radially outermost section of the end face 406. The encapsulation ring 408 has retention element(s) 416, such as two or more barbed grip tabs or a continuously circumferential barbed flange 417, which is/are snapped into the indent 412 of the outer bearing ring 402. The encapsulation ring 408 further includes a first segment 418 which has a first end 420 and a second end 422 and a second segment 424 which has a first end 426 and a second end 428. The first segment 418 extends axially outward, beyond the outer bearing ring 202, from the retention element(s) 416 and the second segment 424 extends radially inward from the second end 422 of the first segment 416. The spring 410, which compensates for varying expansions and contractions caused by temperature changes, is arranged on a step 414 of the outer bearing ring 402, axially between the second segment 424 of the encapsulation ring 408 and the outer bearing ring 402. To prevent the spring 410 from being entirely flattened under load, the retention element(s) 416 of encapsulation ring 408 can bottom out in the indent 412 of the outer bearing ring 402 first.

Figure 6:
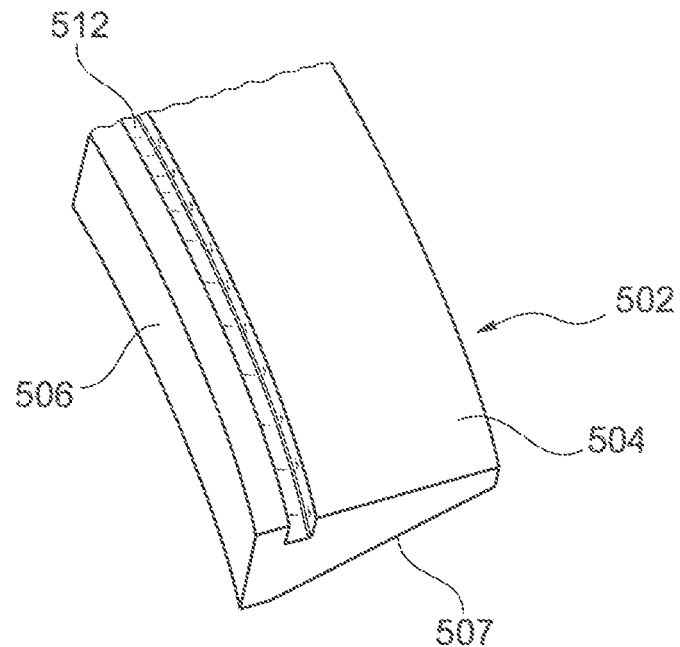
FIG. 6 illustrates a partial perspective view of an outer bearing ring with a continuous indent for an indent.
Figure 7:
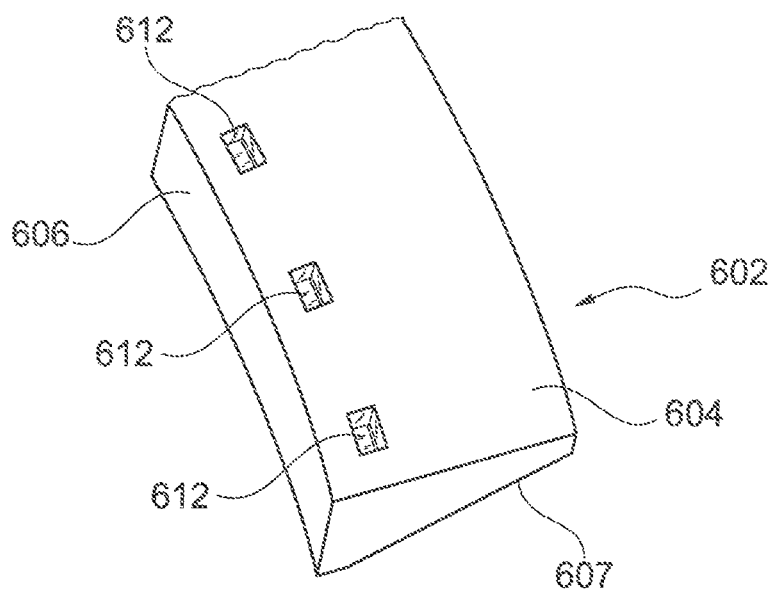
FIG. 7 illustrates a partial perspective view of an outer bearing ring with a discontinuous indent for an indent.

The indent can be a continuous indent or a discontinuous indent that circumscribes the outer ring. FIG. 6 illustrates a perspective view of a portion of outer bearing ring 502 with outer face 504, end face 506 and raceway 507. Continuous indent 512 is in outer face 504. FIG. 7 illustrates a perspective view of a portion of outer bearing ring 602 with outer face 604, end face 606 and raceway 607. Discontinuous indent 612 is in outer face 604. Preferably, the indent is a continuous indent.

Figure 8:
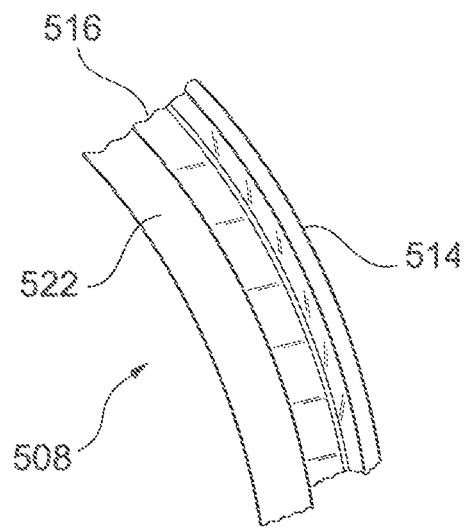
FIG. 8 illustrates a partial perspective view of the encapsulating ring with a continuous retaining element.
Figure 9:
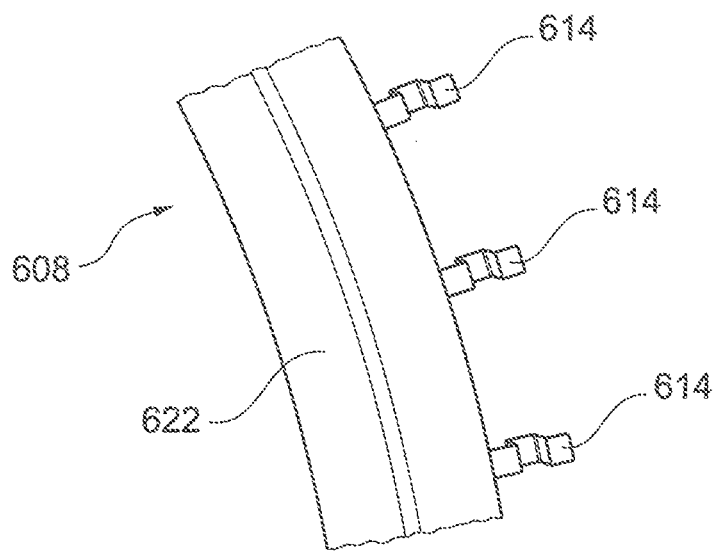
FIG. 9 illustrates a partial perspective view of the encapsulating ring with discontinuous retaining elements.

The encapsulating ring can have a continuous retaining element or a discontinuous retaining element. FIG. 8 illustrates encapsulating ring, 508 with first segment 516 and second segment 522. First segment 516 has continuous retaining element 514. FIG. 9 illustrates encapsulating ring 608 with first segment 616 and second segment 622. Discontinuous retaining elements 614 extend from first segment 616. The spacing of discontinuous indents, as shown in FIG. 7 and discontinuous retaining elements, as shown in FIG. 9 are spaced circumferentially to match each other when used together. Preferably, the encapsulating ring uses a continuous retaining element.

For all embodiments, the indent 112, 212, 312, 412, 512, 612 must be wide enough to allow the encapsulation ring 108, 208, 308, 408, 508, 608 to move axially and, therefore, compensate for thermal expansion.

The spring 110, 210, 310, 410, can be, for example, a wave spring, a disc spring, a belleville washer or a dish shaped flat spring.

The present invention has been described with reference to a preferred embodiment. It should be understood that the scope of the present invention is defined by the claims and is not intended to be limited to the specific embodiment disclosed herein.

REFERENCE CHARACTERS

10 Housing
12 Shaft
14 Bearing
16 Inner bearing ring
18 Roller bodies
20 Bearing race encapsulating apparatus
22 Outer bearing ring
24 Indent
26 Encapsulating ring
28 Spring
100 First Bearing Race Encapsulation Apparatus
102 Outer Bearing Ring
104 Outer Face
106 End Face
107 Raceway
108 Encapsulation Ring
110 Spring
112 Indent
114 Retention Element(s)
116 First Segment
118 First End
120 Second End
122 Second Segment
124 First End
126 Second End
200 Second Bearing Race Encapsulation Apparatus
202 Outer Bearing Ring
204 Outer Face
206 End Face
207 Raceway
208 Encapsulation Ring
210 Spring
212 Indent
214 Retention Element(s)
216 First Segment
218 First End
220 Second End
222 Second Segment
224 First End
226 Second End
228 Third Segment
230 First End
232 Second End
234 Recess
300 Third Bearing Race Encapsulation Apparatus
302 Outer Bearing Ring
304 Outer Face
306 End Face
307 Raceway
308 Encapsulation Ring
310 Spring
312 Indent 314 Step
316 Retention Element(s)
318 First Segment
320 First End
322 Second End
324 Second Segment
326 First End
328 Second End
400 Fourth Bearing Race Encapsulation Apparatus
402 Outer Bearing Ring
404 Outer Face
406 End Face
407 Raceway
408 Encapsulation Ring
410 Spring
412 indent
414 Step
416 Retention Element(s)
417 Barbed grip tabs
418 First Segment
420 First End
422 Second End
424 Second Segment
426 First End
428 Second End
502 Outer bearing ring
504 Outer face
506 End face
507 Raceway
508 Encapsulating ring
512 Continuous indent
514 Continuous retaining element
516 First segment
522 Second segment
602 Out hearing ring
604 Outer face
605 End face
607 Raceway
608 Encapsulating ring
612 Discontinuous indent
614 Discontinuous retaining element
616 First segment
622 Second segment

What is claimed:

1. A bearing race encapsulation apparatus, comprising:
an outer bearing ring defining an axis of rotation and having an end face and an outer face with an indent formed in the outer face;
an encapsulation ring having a retention element, which is snapped into the indent of the outer bearing ring, the indent allowing limited axial movement of the encapsulation ring relative to the outer bearing ring when the retention element is snapped into the indent, the encapsulation ring further comprising a first segment with a first end and a second end and a second segment with a first end and a second end, and a third segment which extends axially inwardly from the second end of the second segment, the first segment extends axially at the retention element from the first end of the first segment to the second end of the first segment and the second segment extends radially inwardly at a substantially 90° angle from the first end of the second segment, which is connected to the second end of the first segment, toward the second end of the second segment; and
a spring biased and arranged axially between the second segment of the encapsulation ring and the outer bearing ring, wherein the spring is prevented from being entirely flattened between the second segment and the outer bearing ring by an interaction between the retention element and the indent or between the encapsulation ring third segment and the end face.

2. The apparatus of claim 1, wherein the retention element is a tab, which is substantially U-shaped and has an extension at one end that axially opposes the first segment.

3. The apparatus of claim 2, wherein the encapsulation ring has two or more tabs.

4. The apparatus of claim 1, wherein the retention element is a substantially U-shaped flange that extends continuously in the indent around the circumference of the outer ring.

5. The apparatus of claim 1, wherein the indent has a width which allows for axial movement of the encapsulation ring.

6. The apparatus of claim 1, wherein the first segment of the encapsulation ring extends axially beyond the end face of the outer bearing ring, and the spring is arranged axially between the second segment of the encapsulation ring and the end face of the outer bearing ring.

* * * * *